United States Patent [19]

Glassmeyer et al.

[11] 4,094,546
[45] June 13, 1978

[54] ROLL AWAY DECKING SYSTEM

[75] Inventors: John J. Glassmeyer, Glenwood, Ill.; Joseph T. Kelley, Hamilton, Ohio

[73] Assignee: Pullman Incorporated, Chicago, Ill.

[21] Appl. No.: 735,290

[22] Filed: Oct. 26, 1976

[51] Int. Cl.² ............................................. B62D 25/20
[52] U.S. Cl. .................................. 296/28 M; 105/375; 312/350
[58] Field of Search ............. 296/28 M; 105/370, 371, 105/375, 373, 376, 378; 52/126; 312/132, 134, 135, 350

[56] References Cited
U.S. PATENT DOCUMENTS 2,603,168  7/1952  Edwards ............................... 105/370

Primary Examiner—Richard A. Bertsch
Attorney, Agent, or Firm—Richard J. Myers

[57] ABSTRACT

A rollaway decking system for use in transport vehicles, e.g., truck trailers or shipping containers, includes a pair of tracks mounted on opposite side walls of the vehicle and a rollaway deck extending between the tracks. The deck has a plurality of articulated panels arranged in and edge to edge relationship with each adjacent pair of panels including an integral, hinge-like linking arrangement extending across the adjacent edges of the panels for pivotally connecting the panels together. Each track includes a support extending underneath the deck for engaging the underside of the deck under heavy load conditions. The deck includes a plurality of deck sections which can be used together or individually to accomodate various loads.

23 Claims, 15 Drawing Figures

ROLL AWAY DECKING SYSTEM

BACKGROUND OF THE INVENTION

1. Field of the Invention

The present invention relates to a rollaway decking system for a transport vehicle and, more particularly, to a rollaway decking system for use in truck trailers or shipping containers to permit maximum utilization of cargo space.

2. Description of the Prior Art

The use of decking systems in transport vehicles, e.g., truck trailers and railroad freight cars, to achieve more efficient utilization of cargo space when carrying cargo having limitations on stacking has been known in the prior art. For example, as disclosed in U.S. Pat. Nos. 302,897; 830,413 and 3,367,287, prior art decking systems have generally included spaced parallel tracks mounted on opposite side walls of the transport vehicle and a movable deck received in the tracks. The decks have usually consisted of flat boards or slats uniformly spaced apart and provided with flexible connections between the adjacent edges of the boards or slats. U.S. Pat. No. 302,897 discloses a flexible connection of wire rope between adjacent pairs of boards. U.S. Pat. No. 830,413 discloses chain-like links between adjacent pairs of slats. The flexible connections allow the decks to be moved between upper storage positions and lower operative positions. However, because of the spaced slat arrangement and flexible connections, such prior art decks have been relatively weak and limited in load-carrying capacity.

In addition, the prior art systems have generally included a single continuous deck of substantially the same length as the transport vehicle. Consequently, with the deck in use, it has been necessary to extend the deck over the entire length of the transport vehicle. It has not been possible to use only a portion of the deck or to interrupt the deck at desired locations along the length of the transport vehicle.

In view of the above limitations of prior art decking systems, it is essential to provide a rollaway decking system which is easily movable and characterized by enhanced strength to allow heavy loads to be applied to the deck. In addition, it is extremely desirable to provide a decking system consisting of distinct sections which can be separated and placed at desirable locations within the transport vehicle to accomodate various types of cargo.

SUMMARY OF THE INVENTION

The invention is summarized in a rollaway decking system for a transport vehicle provided with spaced vertical side walls including a pair of tracks mounted on opposite walls of the transport vehicle, each track including a storage section and an operative section, and a movable deck comprising a plurality of panels extending between the tracks and arranged in an edge to edge relationship, each adjacent pair of panels transversely across the adjacent edges thereof for pivotally connecting the panels together, and means on opposite sides of the deck for engaging the tracks to permit the deck to be moved along the tracks between the storage and operative sections.

It is an object of the invention to provide an improved rollaway decking system for a transport vehicle characterized by enhanced strength and ability to support heavy loads.

It is also an object of the invention to provide a rollaway decking structure consisting of a plurality of articulated panels connected by integrally formed linking means at the adjacent edges of the panels.

It is another object of the invention to provide a rollaway decking system supported at its opposite sides by spaced parallel tracks which include support means extending underneath the deck for engaging the underside of the deck upon application of heavy loads.

It is a further object of the invention to provide a rollaway decking structure consisting of a plurality of distinct deck sections, each including a plurality of articulated panels, which are separated and spaced apart to accomodate various types of cargo.

A preferred embodiment of the rollaway decking system includes a pair of channel-shaped tracks mounted on the side walls of the transport vehicle, each track comprising an upper horizontal guideway, a lower horizontal guideway and a vertical guideway coupling the upper and lower guideways, and a rollaway deck extending between the tracks and including a plurality of rollers at its opposite sides received in the channel-shaped tracks to allow the deck to be moved between the upper and lower horizontal guideways through the vertical guideways. The deck comprises a plurality of elongated panels arranged in an edge to edge relationship and connected by integrally formed linking means at the edges of each adjacent pair of panels comprises a rod-like projection extending transversely across the adjacent edge of one of the panels and a hollow sleeve-like receptacle extending transversely across the adjacent edge of the other panel for receiving the rod-like projection to provide a pivotal connection bteween the adjacent panels.

Preferably, each deck panel comprises an extruded metal member having a corrugated configuration consisting of alternate vertical and horizontal plates. In addition, each panel includes a vertical plate at its front and rear edges. The corrugated configuration of the deck panels enhances the strength of the deck and its ability to support heavy loads in comparison with prior art deck structures.

In the preferred embodiment, the rollers are mounted at the opposite ends of each deck panel by a pair of support blocks secured to the vertical and horizontal plates of the panel, each block including a pin projecting outwardly away from the end of the panel for rotatably supporting one of the rollers. In an alternative embodiment, each of the rod-like projections includes extended portions projecting beyond the opposite sides of its corresponding panel, and the rollers are rotatably mounted on the extended portions of the rod-like projections.

In accordance with another feature of the invention, the lower section of each track includes support means extending underneath the deck for engaging the underside of the deck upon application of heavy loads on the deck. In the preferred embodiment, each of the lower horizontal guideways includes a laterally projecting ledge for supporting the rollers at the opposite sides of the deck, and a lip extending laterally from the ledge underneath the deck panels. The lip is normally spaced from the underside of the panels and engages the underside of the panels upon deflection of the roller support pins under heavy loads on the deck. With the deck panels in engagement with the lower guideway lip, the heavy load applied to the deck is transmitted through the guideway lip instead of pins and rollers.

Further, the vertical guideway can be provided with a slip joint to allow the position of the lower horizontal guideway to be adjusted in relation to the upper horizontal guideway. The lower horizontal guideway can include supports engageable with the vertical side walls of the transport vehicle at various levels to allow the height of the deck to be adjusted.

In accordance with an additional feature of the invention, the deck may be constructed of a plurality of deck sections each including a plurality of elongated panels arranged in an edge to edge relationship with each adjacent pair of panels including integrally formed linking means extending transversely across the adjacent edges thereof for pivotally connecting panels together, and releasable latching means for connecting each deck section to its adjacent deck section. Preferably, each deck section includes locking means on one of the panels engageable with one of the tracks for preventing undesired movement of the deck section relative to the tracks. In addition, each deck section includes a pull strap to facilitate manual movement of the deck section in the tracks.

The present invention provides a decking system suitable for use in a transport vehicle, e.g., a truck trailer or shipping container, which allows the full height of the cargo space to be utilized even in the case of heavy items which cannot be stacked together. The invention provides a rollaway decking system of substantially increased strength which is easily movable between its storage and operative positions and permits the application of heavy loads to the deck. Further, the provision of distinct deck sections which can be latched together or can be used separately allow efficient use of the cargo space because the deck can be interrupted to allow loading of large items which cannot be placed on the deck.

BRIEF DESCRIPTION OF THE DRAWINGS

The accompanying drawings illustrate a preferred embodiment of the present invention and together with the specification serve to explain the principles of the invention.

DESCRIPTION OF THE PREFERRED EMBODIMENT

Figure 1:
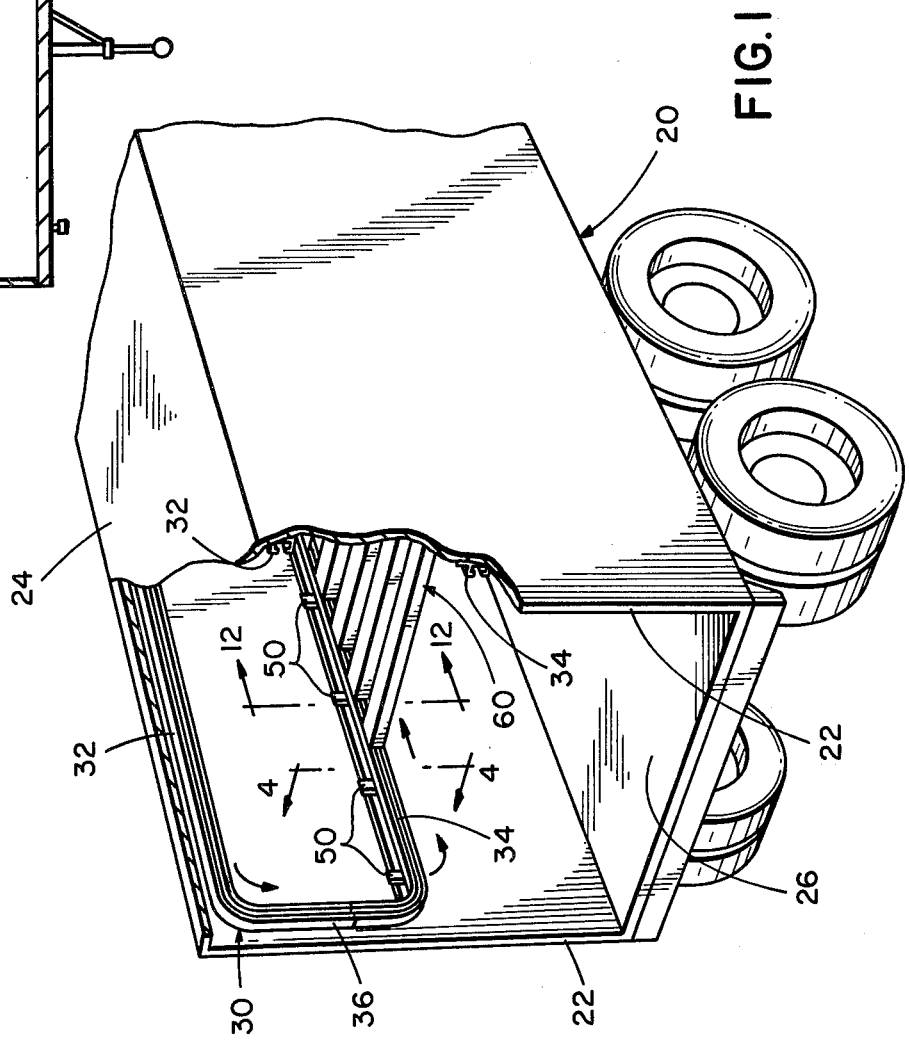
FIG. 1 is a perspective view, partially cutaway, of the rearward portion of a truck trailer including a rollaway decking system comprising a pair of tracks mounted on opposite side walls of the trailer and a rollaway deck extending between the tracks constructed according to the principles of the present invention.

Referring to FIG. 1, a truck trailer, generally 20, includes spaced vertical side walls 22, a roof 24, and a floor 26. A rollaway decking system constructed in accordance with the present invention extends between the side walls of the trailer. The decking system includes a pair of tracks, generally 30, mounted on opposite side walls 22 of the trailer. Each track comprises a storage section or upper horizontal guideway 32, an operative section or lower horizontal guideway 34, and an intermediate interconnecting transfer section or vertical guideway 36 coupling the upper and lower guideways. Since the tracks are mirror images of each other, the same reference numerals are used to identify the corresponding sections of the tracks.

Figure 3:
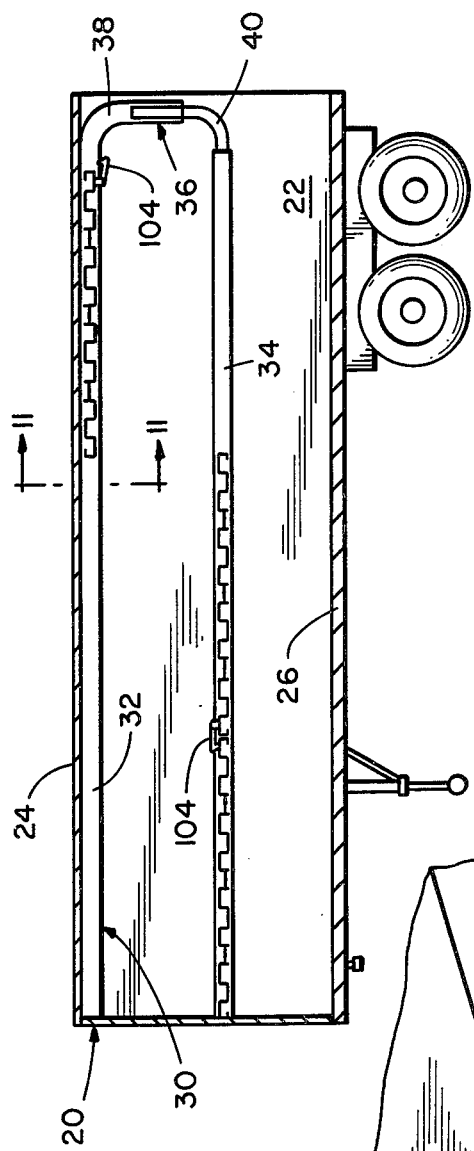
FIG. 3 is a vertical section of the truck trailer and rollaway deck taken along line 3—3 of FIG. 2 illustrating a portion of the deck moved to its operative position in a lower horizontal track section and a portion of the deck located in its storage position in an upper horizontal track section.
Figure 2:
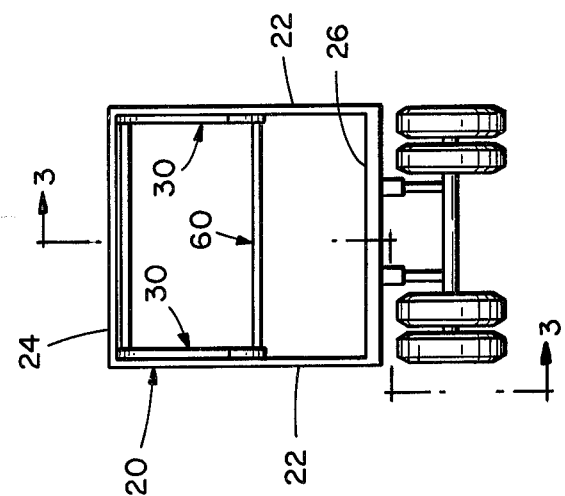
FIG. 2 is a rear elevation of the truck trailer of FIG. 1.
Figure 5:
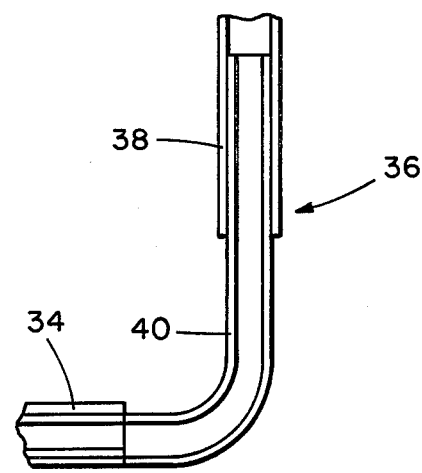
FIG. 5 is an enlarged view illustrating a slip joint provided in a vertical track section coupling the upper and lower track sections.

As shown in FIGS. 3 and 5, each vertical guideway 36 may include a pair of telescoping sections 38 and 40 which provide a slip joint to allow the position of lower guideway 34 to be adjusted relative to upper guideway 32. Telescoping section 38 may comprise an extension of the upper guideway.

Figure 11:
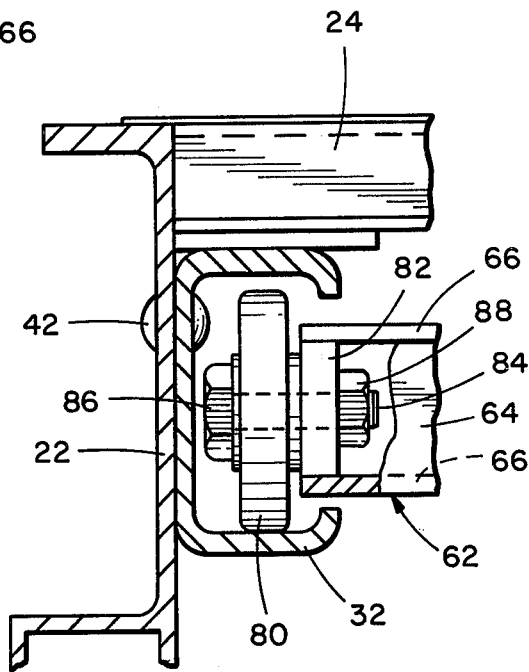
FIG. 11 is an enlarged vertical section of the upper guideway of one of the tracks taken along line 11—11 of FIG. 3.
Figure 12:
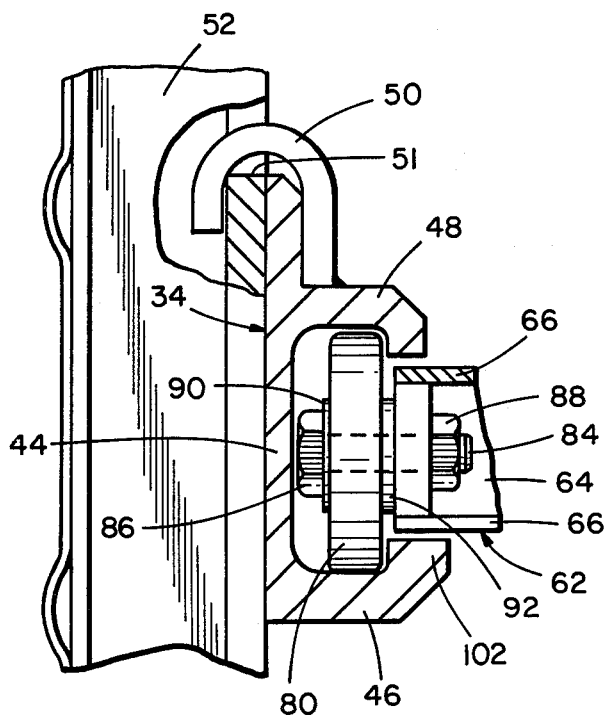
FIG. 12 is an enlarged vertical section of the lower guideway of one of the tracks taken along line 12—12 of FIG. 1 illustrating a lower guideway lip extending underneath the underside of the deck and normally spaced from the underside of the deck.

As shown in FIG. 1, each track is preferably channel-shaped in cross section. Referring to FIG. 11, upper guideway 32 of each track comprises an extruded metal channel, e.g., aluminum, attached to side wall 22 of the trailer by a series of rivets 42 (one shown) adjacent to roof 24 of the trailer. As shown in FIG. 12, lower guideway 34 also comprises an extruded metal channel, e.g., aluminum, which includes a flat, vertical side wall 44 provided with a lower ledge 46 and an upper ledge 48 projecting laterally from side wall 44.

Figure 4:
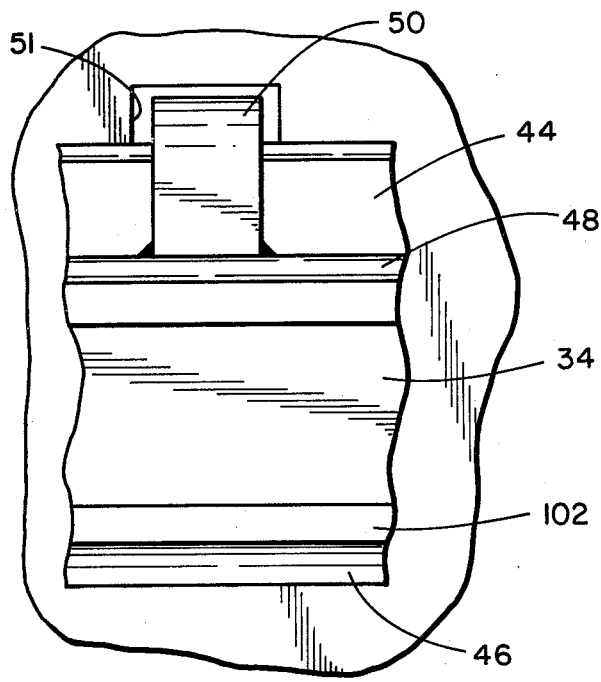
FIG. 4 is an enlarged view of a portion of the lower track section taken along line 4—4 of FIG. 1.

The lower horizontal guideways include securing means engageable with the vertical side walls of the transport vehicle at various levels to allow the height of the guideways to be adjusted. Referring to FIGS. 1 and 12, each lower horizontal guideway 34 includes a plurality of hooks 50 which are adapted to be received in openings 51 provided in a plurality of vertical side posts 52 of the trailer to secure the guideway to side wall 22 and allow the height of the guideway to be adjusted relative to floor 26 of the trailer. As shown in FIGS. 4 and 12, each hook 50 comprises a flat metal band which is bent at its upper end and secured to an upper portion of side wall 44 of the guideway above ledge 48 by any suitable arrangement, e.g., welding. A plurality of chains (not shown) may be provided for coupling lower guideways 34 to the trailer side walls to prevent unauthorized removal of the guideways from the trailer. Alternatively, each lower guideway 34 can be mounted at a fixed height on side posts 52 and hooks 50 can be eliminated.

Further, in accordance with the invention, the rollaway decking system includes a deck comprising a plurality of panels extending between the tracks and arranged in an edge to edge relationship, each adjacent pair of panels including integrally formed linking means extending transversely across the adjacent edges of the panels for pivotally connecting the panels together. The deck also includes means at its opposite sides for engaging the tracks to permit the deck to be moved along the tracks between the storage and operative sections of the tracks.

Figure 6:
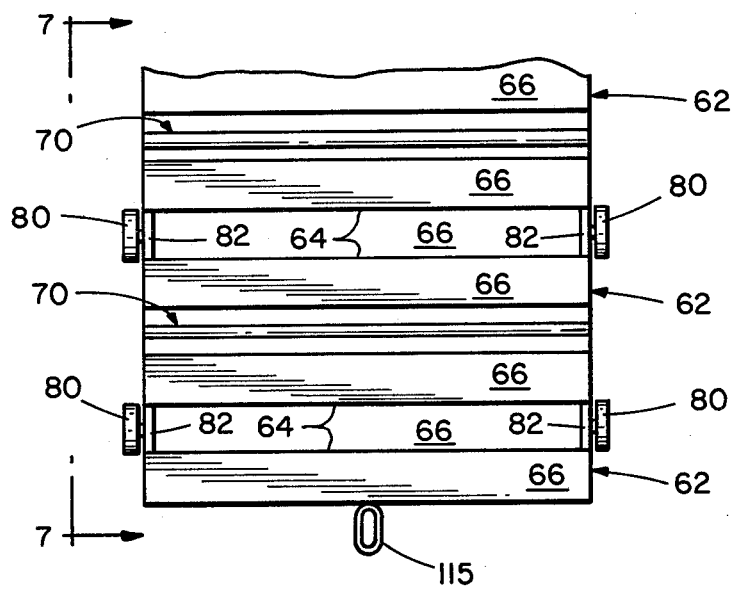
FIG. 6 is a plan view of a portion of the rollaway deck.
Figure 7:
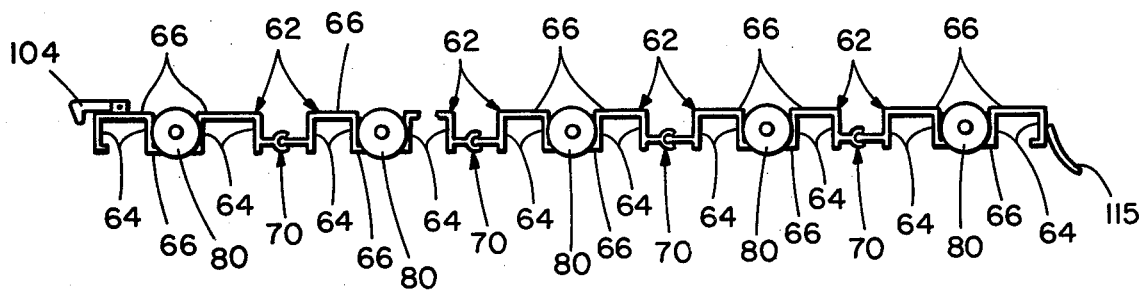
FIG. 7 is a partially cutaway side view taken along line 7—7 of FIG. 6 illustrating a plurality of deck panels which form one section of the rollaway deck.

Referring to FIG. 1, a rollaway deck 60 extends between tracks 30 on opposite side walls 22 of trailer 20. Referring to FIGS. 6 and 7, rollaway deck 60 comprises a plurality of panels 62 arranged edge to edge to provide an articulated panel structure. Preferably, each panel comprises an extruded metal member, e.g. aluminum, having a corrugated configuration consisting of alternate vertical and horizontal plates 64 and 66, respectively. As shown in FIG. 7, each extruded member includes a vertical plate 64 at its front and rear edges. In the preferred embodiment, each deck panel includes four vertical plates 64 and three horizontal plates 66. However, it is contemplated that other plate arrangements can be used within the scope of the present invention.

Figure 8:
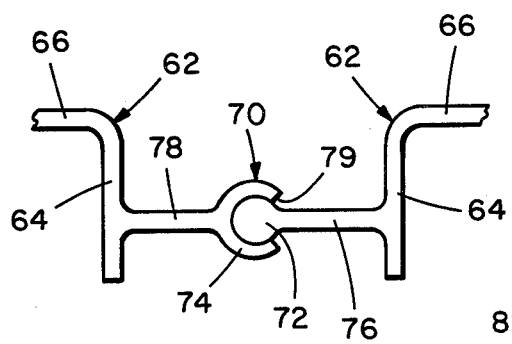
FIG. 8 is an enlarged side view of a pivotal connection between each adjacent pair of deck panels.

As shown in FIGS. 6 and 7, each adjacent pair of panels 62 includes integrally formed linking means extending transversely across the adjacent edges of the panels which is embodied in an elongated pivotal connection 70 at the adjacent edges of the panels. Referring to FIG. 8, each pivotal connection 70 comprises a rod-like projection 72 extending transversely across the adjacent edge of one of the panels and a hollow sleeve-like receptacle 74 extending transversely across the adjacent edge of the other panel for receiving rod-like projection 72 to provide the pivotal connection between the panels. Rod-like projection 72 is formed at the free end of a first flange 76 extending laterally from vertical plate 64 at the adjacent edge of one of the panels toward the other adjacent panel. Hollow sleeve-like receptacle 74 is formed at the free end of a second flange 78 extending laterally from vertical plate 64 at the adjacent edge of the other panel.

As shown in FIG. 8, sleeve-like receptacle 74 includes an opening or slit 79 formed across its outer edge to permit rod-like projection 72 a limited amount of rotation within the sleeve-like receptacle to allow flanges 76 and 78 to pivot relative to each other in hinge-like fashion. Flanges 76 and 78 are spaced upward from the bottom of plates 64 to locate pivot connection 70 at a position intermediate upper and lower horizontal plates 66 of the deck panels. In the assembly of adjacent deck panels 62, rod-like projection 72 slides into sleeve-like receptacle 74 to pivotally connect the adjacent deck panels together.

In the preferred embodiment, the track engaging means at the opposite sides of the rollaway deck comprises a plurality of rollers 80 adapted to be received in channel-shaped tracks 30 to allow deck 60 to be moved between upper guideways 32 and lower guideways 34 through intermediate guideways 36. Referring to FIGS. 6 and 12, each deck panel 62 including a pair of rectangular support blocks 82 mounted at opposite ends of the panel in the rectangular space defined by a pair of adjacent vertical plates 64 and horizontal plate 66 which connects the adjacent vertical plates. Each support block 82 includes a pin 84 projecting outwardly from the corresponding end of the panel 62 for rotatably supporting one of the rollers 80. Each roller support pin 84 is elastically deformable to allow the pin to be slightly deflected when a heavy load is placed on the deck and to return to its normal position when the load is removed. As shown in FIG. 12, each pin 84 is in the form of a bolt having an enlarged head 86 at its outer end and a threaded inner end which extends through an opening in support block 82 and receives a nut 88. A pair of washers 90 and 92 are located on opposite sides of roller 80 to provide bearing surfaces to facilitate rotation of the roller.

Figure 10:
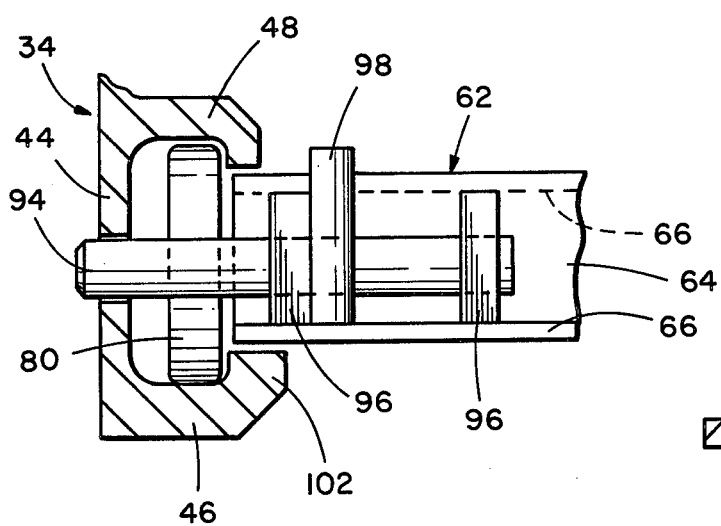
FIG. 10 is an enlarged vertical section of the lower horizontal guideway of one of the tracks and a portion of the rollaway deck illustrating a locking bar used to restrain movement of the deck relative to the track.

Preferably, the deck includes locking means on one of the panels which is engageable with one of the tracks for preventing undesired movement of the deck. Referring to FIG. 10, the locking means is embodied as a side locking bar 94 slidably mounted at the rearmost panel 62 of the deck by a plurality of support blocks 96 provided with suitable openings for receiving the locking bar. The locking bar is movable between retracted and extended positions. The outer end of side locking bar 94 cooperates with suitable openings in the upper and lower track sections to lock the deck against movement when the locking bar is moved to its extended position. A manually operable actuator 98 is secured to the locking bar 94 to facilitate manual movement of the locking bar bewteen its extended and retracted positions.

Figure 13:
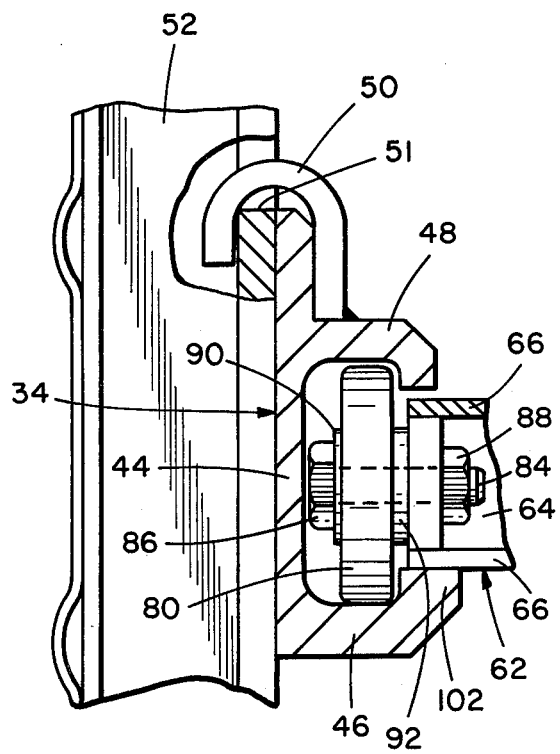
FIG. 13 is a section view, similar to FIG. 12, illustrating the deck moved into engagement with the lower guideway lip under the application of a heavy load on the deck.

In accordance with another feature of the invention, the lower section of each track includes support means extending underneath the deck for engaging the underside of the deck upon application of a heavy load on the deck. Referring the FIG. 12, each lower guideway 34 includes a lip 102 extending upwardly and laterally from ledge 46 underneath the deck panels. When the deck is moved into its operative position in the lower guideways 34, the upper surface of lip 102 on each sideway is normally spaced from the underside of the deck panel by a slight distance. However, as shown in FIG. 13, when a heavy load is placed on the deck, roller support pins 84 are deflected and deck panels 62 are moved downward into engagement with lower guideway lip 102. The lip engages the underside of the deck panels to absorb the heavy load and to prevent overloading and deforming of rollers 80 and pins 84. The provision of the lower guideway lip 102 thus enhances the strength and weight carrying capacity of the rollaway deck.

In accordance with a further feature of the invention, the rollaway deck is divided into a plurality of separate deck sections, each consisting of a plurality of articulated deck panels and including releasable latching means for connecting each deck section to its adjacent deck section. Referring to FIG. 3, for purposes of illustration, the rollaway deck is shown as comprising three separate deck sections. However, it is understood that any desirable number of deck sections may be employed. For example, it has been found convenient to fabricate each deck section with an overall width of 48 inches.

Figure 9:
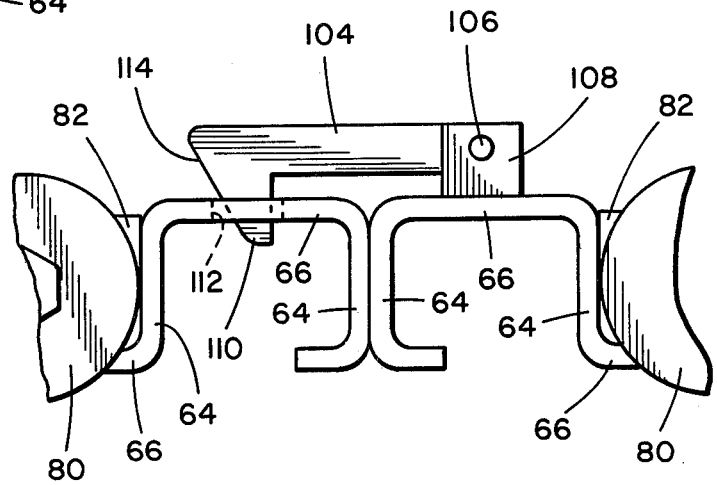
FIG. 9 is an enlarged side view of a latching device use to connect adjacent deck sections together.

As shown in FIGS. 3 and 7, the releasable latching means is embodied as a manually operable lever 104 located at one end of each section. As shown in FIG. 9, latching lever 104 is connected by a pivot pin 106 to a bracket 108 secured to horizontal plate 66 at the edge of the frontmost panel 62 of the deck section. Latching lever 104 includes a nose 110 which is received in an opening 112 provided in horizontal plate 66 at the edge of the rearmost panel 62 of the adjacent deck section to secure the deck sections together. Latching lever 104 is spring-biased downward by a suitable spring arrangement (not shown) to retain nose 110 within opening 112. When it is desired to separate the adjacent deck sections, latching lever 104 is manually pivoted to move nose 110 out of the opening 112 and one of the deck sections is moved along the tracks away from the other. Nose 110 includes an outer, tapered surface 114 to allow the latching lever to pivot upon movement of the adjacent deck sections together to return nose 110 into opening 112.

As shown in FIG. 7, each deck section may be provided with a pull strap 115 to facilitate manual movement of the deck section in the tracks. Alternatively, a cable and drum arrangement may be provided to decrease the effort required to move the full-length deck.

Further, referring to FIG. 10, each deck section may be provided with two locking bars 94 at opposite ends of the rearmost deck panel 62. A plurality of spaced openings (not shown) may be provided in upper and lower track sections 32 and 34, respectively, to allow the deck sections to be locked in various positions in the tracks.

The lower track sections or guideways can be made in modular lengths in multiples of the dimensions of the deck sections to permit variation in the deck height along the length of the trailer. In addition, with extra track sections, multiple decking can be provided. Although aluminium is mentioned as the preferred material for the various components of the decking system, other suitable materials, e.g., steel or plywood, can be employed.

ALTERNATIVE EMBODIMENTS

Figure 14:
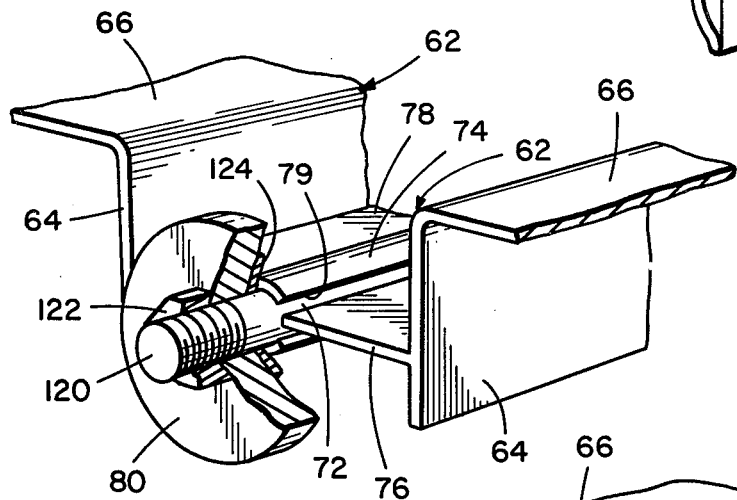
FIG. 14 is an enlarged perspective view of the pivotal connection between adjacent deck panels illustrating a first alternative roller support arrangement.

FIG. 14 illustrates a first alternative embodiment for mounting rollers 80 on the deck panels in which each rod-like projection 72 of pivot connection 70 includes an extension 120 at each of its ends projecting outward from the opposite sides of the deck. One of the rollers 80 is rotatably mounted on each extension 120. The outer end of each extension 120 is threaded to receive a nut 122 to retain roller 80 on the extension. A washer 124 is interposed between roller 80 and the deck panels to provide a bearing surface to facilitate rotation of the roller. Each extension 120 is elastically deformable to allow the extension to deflect when a heavy load is applied to the deck and to return it to its normal position when the load is removed.

Figure 15:
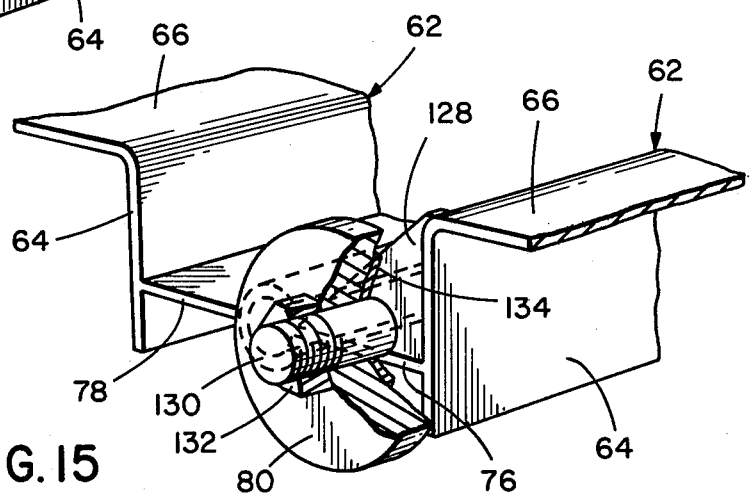
FIG. 15 is an enlarged perspective view of the pivotal connection between adjacent deck panels illustrating a second alternative roller support arrangement.

FIG. 15 illustrates a second alternative embodiment for mounting the rollers 80 at the sides of the rollaway deck. A pair of braces (one shown) each having a right triangular shaped is secured at opposite ends of each deck panel between vertical plate 64 at the edge of the deck panel and horizontal flange 76 which supports rod-like projection 72 of pivot connection 70 between the adjacent deck panels. A shaft 130 projects outward from each brace 128 for rotatably supporting one of the rollers 80. The outer end of each shaft 130 is threaded to receive a nut 132 to retain roller 80 on the shaft. A washer 134 is interposed between roller 80 and brace 128 to provide a bearing surface to facilitate rotation of the roller. Each shaft 130 is elastically deformable to allow the shaft to deflect when a heavy load is applied to the deck and to return to its normal position when the load is removed.

OPERATION

When the rollaway decking system is not in use, the separate sections of the deck 60 are moved into the storage position in the upper horizontal guideways. The deck sections are stored in a upside down attitude in the upper guideway. Side locking bars 94 are moved to the extended positions into the corresponding opening (not shown) in the upper guideways to lock the deck sections against undesired movement.

When it is desired to move the entire deck to its operative system in lower guideways 34, locking bars 34 are retracted and deck 60 is moved through vertical guideways 36 into lower guideways 34 by pulling on pull strap 115 of the rearmost deck section. Spring-biased latching levers 104 link the deck sections together to form a single, continuous full-length deck. The latching levers allow an operator at the rear of the trailer to move all the deck sections without actually entering the trailer. The deck sections are moved rearward along guideways 32, downward through vertical guideways 36, and then forward in guideways 34. When the deck is moved into its operative position, locking bars 94 can again be moved to the extended positions into corresponding openings in guideways 34 to lock the deck sections against movement in the guideways.

Alternatively, one or more deck sections can be moved from the storage position in upper guideways 32 to the operative position in the lower guideways 34 without disturbing the remaining deck sections in the upper guideways by releasing appropriate latching levers 104. Further, it is possible to interrupt the deck in its operative position to leave spacing between the adjacent deck sections to accomodate various types of cargo. Each deck section can be separately locked into place by movement of its locking bars 94 to the extended positions into the corresponding openings in guideways 34.

Inasmuch as the present invention is subject to many variations, modifications and changes in detail, it is intended that all matter contained in the foregoing description or shown on the accompanying drawing shall be interpreted as illustrative and not in a limiting sense.

What is claimed is:

1. A rollaway decking system for transport vehicle provided with spaced vertical sidewalls, comprising;
   a track mounted on each sidewall comprising a storage track section and an operative track section; and
   a flexible movable deck extending between said tracks and means on each sidewall for operatively interconnecting the track sections of the track mounted thereon to permit said deck to be moved between storage and operative positions, and means for selectively positioning said track sections at different operative elevations with respect to each other.

2. The rollaway decking system of claim 1, wherein: said operative section of each track includes supplementary support means extending underneath said deck for engaging the underside of said deck upon application of heavy loads thereon.

3. The rollaway decking system of claim 1, wherein said interconnecting means is vertically adjustable to position said operative section in selected relation to said storage section.

4. The rollaway decking system of claim 1, wherein, said deck including panels arranged in side by side relation and at least one adjacent pair of panels including selectively operable linking means coupling the adjacent edges thereof for pivotally connecting the panels together, thereby accomodating movement of a plurality of panels in unison between said storage and operative sections.

5. A rollaway decking system for a transport vehicle provided with spaced vertical sidewalls, comprising:
   a pair of tracks mounted on opposite sidewalls of a transport vehicle, each track including a storage section and an operative section; and
   a movable deck comprising a plurality of panels extending between said tracks arranged in an edge to edge relationship, each adjacent pair of panels including integrally formed linking means extending transversely across the adjacent edges thereof for pivotally connecting the panels together, and means at opposite sides of said deck for engaging said tracks to permit said deck to be moved along said tracks between said storage and operative sections;
   said linking means comprising a rod-like projection extending transversely across the adjacent edge of one of said panels; and
   a hollow sleeve-like receptacle extending transversely across the adjacent edge of the other of said panels for receiving said rod-like projection to provide a pivotal connection between said adjacent panels.

6. A rollaway decking system for a transport vehicle provided with spaced vertical side walls, comprising:
   a pair of channel shaped tracks mounted on opposite side walls of the transport vehicle, each track comprising an upper horizontal guideway, a lower horizontal guideway, and a vertical guideway coupling said upper and lower guideways; and
   a rollaway deck extending between said tracks and including a plurality of rollers at opposite sides thereof received in said channel-shaped tracks to allow said deck to be moved between said upper and lower guideways through said vertical guideways, said deck comprising a plurality of elongated panels arranged in an edge to edge relationship with each adjacent pair of panels including integrally formed linking means extending transversely across the adjacent edges thereof for pivotally connecting said panels together.

7. The rollaway decking system of claim 6, wherein: each of said lower horizontal guideways includes a lip extending laterally underneath said deck for engaging the underside of said deck upon application of heavy loads.

8. The rollaway decking system of claim 6, wherein each panel comprises:
   an extruded metal member having a corrugated configuration consisting of alternate vertical and horizontal plates.

9. The rollaway decking system of claim 8, wherein each panel includes:
   a pair of rectangular support blocks mounted at opposite ends of said panels between adjacent vertical and horizontal plates, each of said blocks including a pin projecting outwardly away from the end of said panel for rotatably supporting one of said rollers.

10. The rollaway decking system of claim 9, wherein each of the lower horizontal guideways includes a laterally projecting ledge for supporting said rollers at the opposite sides of said panels and a lip extending laterally from the ledge underneath said panels, said lip being normally spaced from the underside of said panels and engaging the underside of said panels upon deflection of said pins under heavy loads on said deck.

11. The rollaway decking system of claim 8, wherein said extruded metal member includes a vertical plate at each of its opposite edges.

12. The rollaway decking system of claim 11, wherein said integrally formed linking means between each adjacent pair of panels comprises:
   a first flange extending laterally from the vertical plate at the adjacent edge of one of said panels and having a free end extending toward said other adjacent panel;
   a rod-like projection at said free end of said first flange extending transversely relative to said one panel;
   a second flange extending laterally from the vertical plate at the adjacent edge of said other adjacent panel and having a free end extending toward said one panel; and
   a hollow sleeve-like receptacle at said free end of said adjacent flange extending transversely relative to said other adjacent panel for receiving said rod-like projecting to provide a pivotal connection between said adjacent panels.

13. The rollaway decking system of claim 12, wherein:
   each rod-like projection includes extending portions projecting transversely beyond the opposite sides of its corresponding panel; and
   said rollers are rotatably mounted on said extended portions of said rod-like projections.

14. The rollaway decking system of claim 6, wherein said vertical guideway includes a slip joint to allow the position of said lower horizontal guideway to be adjusted in relation to said upper guideway.

15. The rollaway decking system of claim 14, wherein each lower horizontal guideway includes securing means engageable with the vertical side walls of the transport vehicle at various levels to allow the height of said deck to be adjusted.

16. The rollaway decking system of claim 6, wherein said deck includes:
   locking means on one of said panels engageable with one of said tracks for preventing undesired movement of said deck.

17. A rollaway decking system for a transport vehicle provided with spaced vertical side walls, comprising:
   a pair of channel-shaped tracks mounted on opposite side walls of the transport vehicle, each track comprising an upper horizontal guideway, a lower horizontal guideway, and a vertical guideway coupling said upper and lower guideways;
   a rollaway deck extending between said tracks and including a plurality of rollers at opposite sides thereof received in said channel-shaped tracks to allow said deck to be moved from said upper guideways through said vertical guideways to said lower guideways, said deck comprising a plurality of elongated panels arranged in an edge to edge relationship with each adjacent pair of panels including integrally formed linking means extending transversely across the adjacent edges thereof for pivotally connecting said panels together; and releasable latching means for connecting each deck section to its adjacent deck section.

18. The rollaway decking system of claim 17, wherein each deck section includes:

locking means on one of said panels engageable with one of said tracks for preventing undesired movement of said deck section relative to said tracks.

19. The rollaway decking system of claim 17, wherein each deck section includes a pull strap to facilitate manual movement of said deck section in said tracks.

20. In combination with a pair of upright supports, a decking system comprisng a U-shaped track on each support including upper and lower generally horizontal track portions and an adjacent intervening transfer portion interconnecting one of the ends of associated upper and lower track portions, and a deck extending between said supports and comprising a plurality of panels extending at its ends into respective tracks, said panels being movable between said upper and lower track portions via said intervening track section, and means on said supports and track for positioning the same in different operative elevations.

21. The invention according to claim 20, said panels being downwardly deflectable upon loading and means on said tracks engageable by the panels upon deflection of said deck.

22. The invention according to claim 20, and roller means on said ends of said panels disposed in rolling relation to respective tracks.

23. The invention according to claim 20, and said transfer portion being adjustable to vary the junction between said upper and lower portions.

* * * * *